United States Patent [19]

Bonora

[11] Patent Number: 5,948,836
[45] Date of Patent: *Sep. 7, 1999

[54] STABILIZER COMBINATION FOR SYNTHETIC ORGANIC POLYMERS

[75] Inventor: Michela Bonora, Casalecchio di Reno, Italy

[73] Assignee: Ciba Specialty Chemicals Corporation, Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/939,219

[22] Filed: Sep. 29, 1997

Related U.S. Application Data

[63] Continuation of application No. 08/635,815, Apr. 22, 1996, abandoned.

[30] Foreign Application Priority Data

Apr. 26, 1995 [IT] Italy .................................. MI95A0834

[51] Int. Cl.⁶ .............................. C08K 5/35; C08K 3/32; C08K 3/18; C08K 3/22
[52] U.S. Cl. ......................... 524/99; 524/100; 524/102; 524/414; 524/415; 524/417; 524/427; 524/432; 524/433; 524/442
[58] Field of Search .............................. 524/99, 100, 102, 524/432, 433, 414, 415, 417, 427, 442

[56] References Cited

U.S. PATENT DOCUMENTS

| | | | |
|---|---|---|---|
| 4,590,231 | 5/1986 | Seltzer et al. | 524/100 |
| 4,831,134 | 5/1989 | Winter et al. | 540/524 |
| 5,004,770 | 4/1991 | Cortolano et al. | 524/99 |
| 5,037,870 | 8/1991 | Gugumus | 524/102 |
| 5,096,950 | 3/1992 | Galbo et al. | 524/99 |
| 5,134,181 | 7/1992 | Masina | 524/100 |
| 5,180,762 | 1/1993 | Canova | 524/100 |
| 5,204,473 | 4/1993 | Winter et al. | 546/188 |
| 5,244,949 | 9/1993 | Worth et al. | 524/100 |
| 5,283,273 | 2/1994 | Sander et al. | 524/99 |
| 5,300,647 | 4/1994 | Malherbe et al. | 546/188 |
| 5,350,785 | 9/1994 | Sander et al. | 524/100 |
| 5,414,030 | 5/1995 | Kotani et al. | 524/99 |

FOREIGN PATENT DOCUMENTS

| | | |
|---|---|---|
| 0429731 | 6/1991 | European Pat. Off. . |
| 0500073 | 8/1992 | European Pat. Off. . |
| 570337 | 11/1993 | European Pat. Off. . |
| 2293827 | 4/1996 | United Kingdom . |

OTHER PUBLICATIONS

CA 109:151118q, JP 63175072, Jul. 19, 1988.
CA 112:37706s, JP 01200957, Aug. 14, 1989.
CA 111:79551x, JP 01006041, Jan. 10, 1989.
T. Kurumada et al. J. Polim Science, Polym Chem. Ed 22, 277 (1984).
Derwent Abstract No. 92–205259.

*Primary Examiner*—Kriellion S. Morgan
*Attorney, Agent, or Firm*—Luther A. R. Hall

[57] ABSTRACT

Compositions comprising a synthetic organic polymer and, as stabilizer, a combination of A) a sterically hindered hydroxylamine, or an ether or ester thereof, and B) a compound containing an oxo and/or hydroxyl group bonded to a metal atom, show an excellent stability against the deleterious effects of light, oxygen and/or heat.

A combination of components A and B is also effective to stabilize a polyolefin or olefin copolymer film for agricultural applications against deleterious effects of light, oxygen, heat and pesticides.

15 Claims, No Drawings

STABILIZER COMBINATION FOR SYNTHETIC ORGANIC POLYMERS

This is a continuation of application Ser. No. 08/635,815, filed on Apr. 22, 1996, now abandoned.

This invention pertains to a synthetic organic polymer, especially a polyolefin or olefin copolymer, stabilized with a combination of a sterically hindered hydroxylamine, or an ether or ester thereof, and a compound containing an oxo and/or hydroxyl group bonded to a metal atom, especially stabilized films in contact with a pesticide, and further to a process for stabilising a synthetic organic polymer with a combination of a sterically hindered hydroxylamine, or an ether or ester thereof, and a compound containing an oxo and/or hydroxyl group bonded to a metal atom and the corresponding use of this stabilizer combination.

Sterically hindered hydroxylamines, or ethers or esters thereof, as stabilizers for synthetic organic polymers have been proposed in a number of publications including T. Kurumada et al., J. Polym. Science, Polym. Chem. Ed. 22, 277 (1984); U.S. Pat. No. 4,590,231; U.S. Pat. No. 5,300,647; U.S. Pat. No. 4,831,134; U.S. Pat. No. 5,204,473; U.S. Pat. No. 5,004,770; U.S. Pat. No. 5,096,950.

The use of conventional sterically hindered amines in combination with a hydrotalcite or with selected metal oxides has been proposed to attain an improved light stability (EP-A-500 073, C.A. 109:151118q, C.A. 1 12:37706s, C.A. 111:79551x, EP-A-429 731, U.S. Pat. No. 5,037,870, U.S. Pat. No. 5,134,181, U.S. Pat. No. 5,180,762).

It has now been found that, surprisingly, the light stability of a synthetic organic polymer can be distinctly improved by a combination of a sterically hindered hydroxylamine, or an ether or ester thereof, and a compound containing an oxo and/or hydroxyl group bonded to a metal atom. Accordingly, subject of the invention is a composition comprising a synthetic organic polymer and, as stabilizer against the deleterious effects of light, oxygen and/or heat, a combination of A) a sterically hindered hydroxylamine, or an ether or ester thereof, and
B) a compound containing at least one oxo and/or hydroxyl group bonded to a metal atom.

The composition of the invention may contain a single compound as component A and component B, respectively, or each component may consist of a mixture of compounds.

The compound containing an oxo and/or hydroxyl group bonded to a metal atom to be used as component B contains one or more O and/or OH bonded exclusively to one or more metallic elements; these metallic elements are preferably those of groups IIa or IIb or IIIb of the periodic system (main groups II and III and group II of transition metals). Most preferred metals are magnesium, calcium, zinc and aluminum. The compound containing an oxo and/or hydroxyl group bonded to a metal atom is preferably inorganic, containing either no carbon atoms or carbon atoms only as inorganic carbonate ($HCO_3^-$, $CO_3^{2-}$).

These compounds include mainly simple or complex oxides, hydroxides or mixed oxides/hydroxides of metals of groups IIa or IIb or IIIb of the periodic system, as well as zeolithes and hydrotalcites. Preferred are compounds which react neutral or basic in contact with water.

Suitable hydrotalcites include those of the formula $$M^{2+}_{1-x} \bullet M^{3+}_x \bullet (OH)_2 \bullet (A^{n-})_{\frac{x}{n}} \bullet pH_2O \tag{I}$$

wherein $M^{2+}$ is Mg, Ca, Sr, Ba, Zn, Sn and/or Ni, $M^{3+}$ is Al, B or Bi, $A^n$ is an Anion of the valency n, n is a number from 1 to 4, x is a number from 0 to 0,5, p is a number from 0 to 2 and A is $OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$,

$(CHOHCOO)_2^{2-}$, $(CHOH)_4CH_2OHCOO^-.C_2H_4(COO)_2^{2-}$, $(CH_2COO)_2^{2-}$, $CH_3CHOHCOO^-$, $SiO_3^{2-}$, $SiO_4^{4-}$, $BO_3^{3-}$, $PO_3^{3-}$ or $HPO_4^{2-}$.

Preferred are hydrotalcites of the above formula I, wherein $M^{2+}$ stands for $Ca^{2+}$, $Mg^{2+}$ or a mixture of $Mg^{2+}$ and $Zn^{2+}$, $A^{n-}$ for $CO_3^{2-}$, $BO_3^{3-}$ or $PO_3^{3-}$, x is a number from 0 to 0.5 and p is a number from 0 to 2.

Other hydrotalcites, which may be added advantageously, are compounds of formula Ia, $$M_x^{2+}Al_2(OH)_{2x+6nz}(A^{n-})_2 \cdot pH_2O \tag{Ia}$$

wherein in formula Ia $M^{2+}$ stands for Mg or Zn, preferably for Mg, $A^{n-}$ for an anion, e.g. an anion selected from the group consisting of $CO_3^{2-}$,

$OH^-$ and $S^{2-}$, where n is the valency of the anion, p stands for a positive number, preferably ranging from 0 to 5, for example from 0.5 to 5, and x and z are positive numbers, x ranging preferably from 2 to 6 and z being less than 2.

Most preferred are hydrotalcites corresponding to formulae Ib–Ih

| | |
|---|---|
| $Al_2O_3 \bullet 6MgO \bullet CO_2 \bullet 12H_2O$, | (Ib) |
| $Mg_{4.5}Al_2(OH)_{13} \bullet CO_3 \bullet 3,5H_2O$, | (Ic) |
| $4MgO \bullet Al_2O_3 \bullet CO_2 \bullet 9H_2O$, | (Id) |
| $4MgO \bullet Al_2O_3 \bullet CO_2 \bullet 6H_2O$, | (Ie) |
| $ZnO \bullet 3MgO \bullet Al_2O_3 \bullet CO_2 \bullet 8-9H_2O$, | (If) |
| $ZnO \bullet 3MgO \bullet Al_2O_3 \bullet CO_2 \bullet 5-6H_2O$, | (Ig) |
| $Mg_{4.5}Al_2(OH)_{13} \bullet CO_3$. | (Ih) |

In the practice of this invention it is also possible to use as component B zeolites of the general formula (II)

$$M_{x/n}[(AlO_2)_x(SiO_2)_y] \cdot wH_2O \tag{II}$$

wherein n is the charge of the cation M, and M is an element of the first or second main group, in particular Na, K, Mg and/or Ca, y:x is a number from 0.8 to 1.2, and w is a number from 0.5 to 10.

Basic zeolites are preferred.

Typical examples of suitable zeolites are compounds of the following empirical formulae:

$$Na_{12}[(AlO_2)_{12}(SiO_2)_{12}]\cdot 12H_2O$$

$$Ca_{4.5}Na_3[(AlO_2)_{12}(SiO_2)_{12}]\cdot 30H_2O$$

$$K_9Na_3[(AlO_2)_{12}(SiO_2)_{12}]\cdot 27H_2O$$

Other compounds suitable as component B include those of the formula $\{(Mt_2O)_m\cdot(Al_2O_3)_n\cdot Z_o\cdot pH_2O\}$ (I), wherein Mt is H, Na, K, $Mg_{1/2}$, $Ca_{1/2}$, $Sr_{1/2}$ or $Zn_{1/2}$;

$Z_o$ is $CO_2$, $B_4O_6$, or $C_2O_2$ (oxalate);

m is, if Mt is $Mg_{1/2}$ or $Ca_{1/2}$, a number between 1 and 2, in all other cases a number between 1 and 3;

n is a number between 1 and 4;

o is a number between 2 and 4; and p is a number between 0 and 30.

Of special interest as component B are simple oxides or hydroxides of zinc, aluminum, calcium or magnesium, especially zinc oxide, zinc hydroxide, ortho and/or meta aluminum hydroxide, α- and/or γ-$Al_2O_3$, MgO, $Mg(OH)_2$, and the hydrotalcites of the above formulae Ib–Ih. Preferred are hydrotalcite of formula Ic, zinc oxide and zinc hydroxide; most preferred is zinc oxide and hydrotalcite of formula Ic.

It has to be emphasized that an especially advantageous stabilization may be achieved if a hydrotalcite is employed in addition to one or more simple oxides or hydroxides of metals of groups IIa or IIb or IIIb of the periodic system, e.g. a hydrotalcite and one or more of the compounds zinc oxide, zinc hydroxide, ortho and/or meta aluminum hydroxide, α- and/or γ-$Al_2O_3$, MgO, $Mg(OH)_2$.

Preferred synthetic organic polymer is a polyolefin or olefin copolymer. Such polyolefins or olefin copolymers are mainly the materials listed below:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Of major interest are polymers of monoolefins, especially α-monoolefins, for example polypropylene, polyisobutylene, polybut-1-ene, poly-4-methylpent-1-ene, as well as polymers of cycloolefins, polyethylene (which optionally can be crosslinked), for example high density polyethylene (HDPE), low density polyethylene (LDPE), linear low density polyethylene (LLDPE), branched low density polyethylene (BLDPE), and copolymers of these monomers or with vinyl acetate. Preferred are polyethylene, ethylene/propylene copolymer, ethylene/vinyl acetate copolymer and polypropylene; especially polyethylene, which is often LDPE.

Said polyolefines or olefin copolymers are often polymer films, e.g. polyethylene film, especially for agricultural uses.

Further synthetic organic polymers advantageously to be stabilized according to the invention include the materials listed below:

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof; for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The sterically hindered hydroxylamine or ether or ester thereof (component A) usually is a derivative of a cyclic sterically hindered amine, more particularly a compound of the series of the derivatives of polyalkylpiperidines or polyalkylpiperazines, comprising at least one group of formula III or IIIa

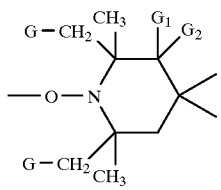

(III)

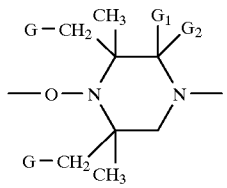

(IIIa)

wherein G is hydrogen or methyl, and $G_1$ and $G_2$ are hydrogen, methyl or, taken together, are =O. The polyalkylpiperidine groups of formula III or IIIa are preferably bonded in 4-position to one or two polar substituents or to a polar spiro ring system.

Examples for such compounds can be found in U.S. Pat. Nos. 4,590,231, 5,300,647, 4,831,134, 5,204,473, 5,004,770, 5,096,950, 5,021,478, 5,118,736, 5,021,480, 5,015,683, 5,021,481, 5,019,613, 5,021,486, 5,021,483, 5,145,893, 5,286,865, 5,359,069, 4,983,737, 5,047,489, 5,077,340, 5,021,577, 5,189,086, 5,015,682, 5,015,678, 5,051,511, 5,140,081, 5,204,422, 5,026,750, 5,185,448, 5,180,829, 5,262,538, 5,371,125, 5,216,156, 5,300,544.

Among the sterically hindered hydroxylamines or ethers or esters thereof useful as component A, ethers or esters of hydroxylamines, especially ethers, are of particular technical interest.

The use of derivatives of 2,2,6,6-tetramethylpiperidine (formula III) as component A is preferred; particularly the use of compounds containing a group of the formula

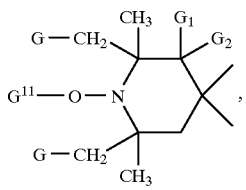

wherein G is hydrogen, $G_1$ and $G_2$ are as defined above and $G^{11}$ is hydrogen, $C_1$–$C_{18}$alkyl, $C_2$–$C_{18}$alkenyl, $C_3$–$C_{18}$alkynyl, $C_5$–$C_{12}$cycloalkyl, $C_6$–$C_{10}$ bicycloalkyl, $C_5$–$C_8$cycloalkenyl, phenyl, naphthyl, $C_7$–$C_{12}$phenylalkyl, phenyl or phenylalkyl substituted by alkyl or phenyl of 7–14 carbon atoms, or a group of the formula

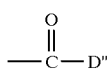

wherein D' is $C_1$–$C_{18}$alkyl, $C_1$–$C_{18}$alkoxy, phenyl, or phenyl substituted by hydroxy, $C_1$–$C_8$alkyl, $C_1$–$C_8$alkoxy, amino or amino mono- or disubstituted by $C_1$–$C_8$alkyl or phenyl.

$G^{11}$ is especially $C_1$–$C_{18}$alkyl, $C_3$–$C_8$alkenyl, $C_3$–$C_8$alkynyl, $C_5$–$C_8$cycloalkyl, $C_7$–$C_9$phenylalkyl, $C_2$–$C_{18}$alkanoyl, $C_3$–$C_6$alkenoyl, e.g. $C_1$–$C_{18}$alkyl, $C_5$–$C_8$cycloalkyl or $C_7$–$C_9$phenylalkyl.

More preferably, $G^{11}$ is $C_1$–$C_{12}$alkyl, benzyl, or $C_5$–$C_8$cycloalkyl; most preferably $C_6$–$C_{10}$alkyl or cyclohexyl.

The use of the classes of sterically hindered amine derivatives described hereinafter under (a) to (h) and carrying at least one group of formula III or IIIa as indicated above, is of particular interest:

(a) compounds of formula IV

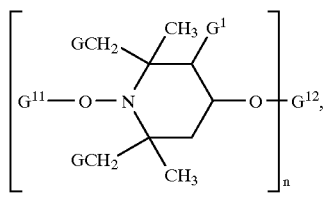

(IV)

wherein n is a number from 1 to 4, G and $G^1$ are each independently of the other hydrogen or methyl, $G^{11}$ is as defined above, and $G^{12}$, if n=1, is hydrogen, $C_1$–$C_{18}$alkyl which may be interrupted by one or more than one oxygen atom, cyanoethyl, benzyl, glycidyl, a monovalent radical of an aliphatic, cycloaliphatic, araliphatic, unsaturated or aromatic carboxylic acid, carbaminic acid or phosphorus-containing acid, or a monovalent silyl radical, preferably a radical of an aliphatic carboxylic acid of 2 to 18 carbon atoms, of a cycloaliphatic carboxylic acid of 7 to 15 carbon atoms, of a α,β-unsaturated carboxylic acid of 3 to 5 carbon atoms, or of an aromatic carboxylic acid of 7 to 15 carbon atoms, and the carboxylic acid may be in each case substituted in the aliphatic, cycloaliphatic or aromatic moiety by 1 to 3 groups —COO$Z^{12}$, wherein $Z^{12}$ is H, $C_1$–$C_{20}$alkyl, $C_3$–$C_{12}$alkenyl, $C_5$–$C_7$cycloalkyl, phenyl or benzyl, if n=2, is $C_2$–$C_{12}$alkylene, $C_4$–$C_{12}$alkenylene, xylylene, a divalent radical of an aliphatic, cycloaliphatic, araliphatic or aromatic dicarboxylic acid, dicarbamic acid or phosphorus-containing acid, or a divalent silyl radical, preferably a radical of an aliphatic dicarboxylic acid of 2 to 36 carbon atoms, of a cycloaliphatic or aromatic dicarboxylic acid of 8 to 14 carbon atoms or of an aliphatic, cycloaliphatic or aromatic dicarbamic acid of 8 to 14 carbon atoms, and the dicarboxylic acid may be in each case substituted in the aliphatic, cycloaliphatic or aromatic moiety by 1 or 2 groups —COO$Z^{12}$, if n=3, is a trivalent radical of an aliphatic, cycloaliphatic or aromatic tricarboxylic acid, which radical can be substituted in the aliphatic, cycloaliphatic or aromatic moiety by —COO$Z^{12}$, or is a trivalent radical of an aromatic tricarbamic acid or of a phosphorus-containing acid, or is a trivalent silyl radical, and if n=4, is a tetravalent radical of an aliphatic, cycloaliphatic or aromatic tetracarboxylic acid.

The indicated carboxylic acid radicals in each case comprise radicals of formula (—CO)$_n$R, in which the meaning of n is as indicated above and the meaning of R follows from the given definition.

$C_1$–$C_{12}$Alkyl substituents are typically methyl, ethyl, n-propyl, n-butyl, sec-butyl, tert-butyl, n-hexyl, n-octyl, 2-ethylhexyl, n-nonyl, n-decyl, n-undecyl or n-dodecyl.

$G^{11}$ or $G^{12}$ defined as $C_1$–$C_{18}$alkyl may typically be the groups indicated above and, in addition, e.g. n-tridecyl, n-tetradecyl, n-hexadecyl or n-octadecyl.

$G^{11}$ defined as $C_3$–$C_8$alkenyl may be, for example, 1-propenyl, allyl, methallyl, 2-butenyl, 2-pentenyl, 2-hexenyl, 2-octenyl, 4-tert-butyl-2-butenyl.

$G^{11}$ defined as $C_3$–$C_8$alkynyl is preferably propargyl.

$G^{11}$ defined as $C_7$–$C_{12}$phenylalkyl is preferably phenethyl, more particularly benzyl.

$G^{11}$ defined as $C_2$–$C_{18}$alkanoyl is typically propionyl, butyryl, octanoyl, but preferably acetyl and, as $C_3$–$C_6$alkenoyl, is preferably acryloyl or methacryloyl.

$G^{12}$ defined as a monovalent radical of a carboxylic acid is typically the radical of acetic acid, hexanoic acid, stearic acid, acrylic acid, methacrylic acid, benzoic acid or β(3,5-di-tert-butyl-4-hydroxy-phenyl)propionic acid; preferred is stearic acid, acrylic acid, methacrylic acid.

$G^{12}$ defined as a monovalent silyl radical is typically a radical of formula —$(C_jH_{2j})$—$Si(Z')_2Z''$, wherein j is an integer from 2 to 5, and $Z'$ and $Z''$ are each independently of the other $C_1$–$C_4$alkyl or $C_1$–$C_4$alkoxy.

$G^{12}$ defined as a divalent radical of a dicarboxylic acid is typically the radical of malonic acid, succinic acid, glutaric acid, adipic acid, subaric acid, sebacic acid, maleic acid, itaconic acid, phthalic acid, dibutylmalonic acid, dibenzylmalonic acid, butyl(3,5-di-tert-butyl-4-hydroxybenzyl) malonic acid or bicycloheptenedicarboxylic acid.

$G^{12}$ defined as a trivalent radical of a tricarboxylic acid is typically the radical of trimellitic acid, citric acid or nitrilotriacetic acid.

$G^{12}$ defined as a tetravalent radical of a tetracarboxylic acid is typically the tetravalent radical of butane-1,2,3,4-tetracarboxylic acid or of pyromellitic acid.

$G^{12}$ defined as a divalent radical of a dicarbamic acid is typically a hexamethylenedicarbamic acid radical or a 2,4-toluylenedicarbamic acid radical.

Preferred compounds are those of formula IV, wherein G and $G^1$ are hydrogen, $G^{11}$ is $C_6$–$C_{10}$alkyl or cyclohexyl, n is 1 or 2, and $G^{12}$ is the acyl radical of an aliphatic monocarboxylic acid of 12 to 18 carbon atoms or the diacyl radical of an aliphatic dicarboxylic acid of 4 to 12 carbon atoms.

Important examples for polyalkylpiperidine compounds of this class are:
1) 1-octyloxy-4-hydroxy-2,2,6,6-tetramethylpiperidine
2) 1-cyclohexyloxy-4-hydroxy-2,2,6,6-tetramethylpiperidine
3) 1-cyclohexyloxy-4-stearoyloxy-2,2,6,6-tetramethylpiperidine
4) bis(1-cyclohexyloxy-2,2,6,6-tetramethylpiperidin-4-yl) succinate
5) bis(1-cyclohexyloxy-2,2,6,6-tetramethylpiperidin-4-yl) adipate
6) bis(1-octyloxy-2,2,6,6-tetramethylpiperidin-4-yl) sebacate.

(b) Compounds of formula (V)

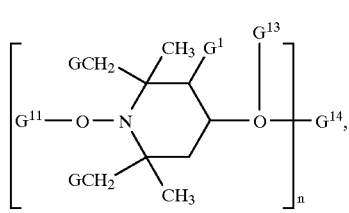

(V)

wherein n is 1 or 2, and G, $G^1$ and $G^{11}$ have the meaning given in (a), $G^{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of formula Va

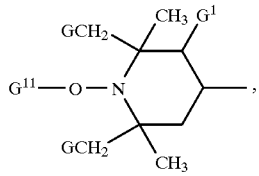

(Va)

and $G^{14}$, if n=1, is hydrogen, $C_1$–$C_{18}$alkyl, $C_3$–$C_8$alkenyl, $C_5$–$C_7$cycloalkyl; $C_1$–$C_4$alkyl which is substituted by a hydroxy, cyano, alkoxycarbonyl or carbamide group; glycidyl; a group of formula —$CH_2$—$CH(OH)$—Z or of formula —$CONH$—Z, wherein Z is hydrogen, methyl or phenyl;

if n=2, is $C_2$–$C_{12}$alkylene, $C_6$–$C_{12}$arylene, xylylene, a —$CH_2$—$CH(OH)$—$CH_2$— group or a group —$CH_2$—$CH(OH)$—$CH_2$—O—D—O—, wherein D is $C_2$–$C_{10}$alkylene, $C_6$–$C_{15}$arylene, $C_6$–$C_{12}$cycloalkylene; or, provided that $G^{13}$ is not alkanoyl, alkenoyl or benzoyl, $G^{14}$ may also be 1-oxo-$C_2$-$C_{12}$alkylene, a divalent radical of an aliphatic, cycloaliphatic or aromatic dicarboxylic acid or dicarbamic acid, or also the group —CO—; or if n=1, $G^{13}$ and $G^{14}$, taken together, may be the divalent radical of an aliphatic, cycloaliphatic or aromatic 1,2-dicarboxylic acid or 1,3-dicarboxylic acid.

$C_1$–$C_{12}$Alkyl substituents or $C_1$–$C_{18}$alkyl substituents have the meaning indicated under (a).

$C_5$–$C_7$Cycloalkyl substituents are preferably cyclohexyl.

$G^{13}$ defined as $C_7$–$C_8$aralkyl is preferably phenylethyl or, more particularly, benzyl. $G^{13}$ defined as $C_2$–$C_5$hydroxyalkyl is preferably 2-hydroxyethyl or 2-hydroxypropyl.

$G^{13}$ defined as $C_2$–$C_{18}$alkanoyl is typically propionyl, butyryl, octanoyl, dodecanoyl, hexadecanoyl, octadecanoyl, but preferably acetyl and, as $C_3$–$C_5$alkenoyl, is preferably acryloyl.

$G^{14}$ defined as $C_2$–$C_8$alkenyl is typically allyl, methallyl, 2-butenyl, 2-pentenyl, 2-hexenyl or 2-octenyl.

$G^{14}$ defined as $C_1$–$C_4$alkyl which is substituted by a hydroxy, cyano, alkoxycarbonyl or carbamide group may typically be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

$C_2$–$C_{12}$Alkylene substituents are typically ethylene, propylene, 2,2-dimethylpropylene, tetramethylene, hexamethylene, octamethylene, decamethylene or dodecamethylene.

$C_6$–$C_{15}$Arylene substituents are typically o-, m- or p-phenylene, 1,4-naphthylene or 4,4'-diphenylene.

$C_6$–$C_{12}$Cycloalkylene is preferably cyclohexylene.

Preferred compounds are those of formula V, wherein n is 1 or 2, G is hydrogen, $G^{11}$ is $C_6$–$C_{10}$alkyl or cyclohexyl, $G^{13}$ is hydrogen, $C_1$–$C_{12}$alkyl or a group of formula Va and, if n=1, $G^{14}$ is hydrogen or $C_1$–$C_{12}$alkyl and, if n=2, is $C_2$–$C_8$alkylene or 1-oxo-$C_2$-$C_9$alkylene.

(c) Compounds of formula (VI)

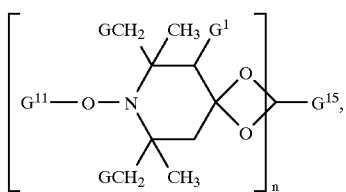

wherein n is 1 or 2, and G, $G^1$ and $G^{11}$ have the meaning indicated under (a), and $G^{15}$, if n=1, is $C_2$–$C_8$alkylene, $C_2$–$C_8$hydroxyalkylene or $C_4$–$C_{22}$acyloxyalkylene; if n=2, is the group (—$CH_2$)$_2$C($CH_2$—)$_2$.

$G^{15}$ defined as $C_2$–$C_8$alkylene or $C_2$–$C_8$hydroxyalkylene is typically ethylene, 1-methylethylene, propylene, 2-ethylpropylene or 2-ethyl-2-hydroxymethylpropylene.

$G^{15}$ defined as $C_4$–$C_{22}$acyloxyalkylene is typically 2-ethyl-2-acetoxymethylpropylene.

(d) compounds of formulae VIIA, VIIB and VIIC, preferably compounds of formula VIIC,

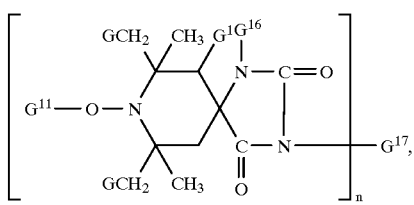

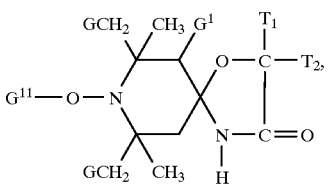

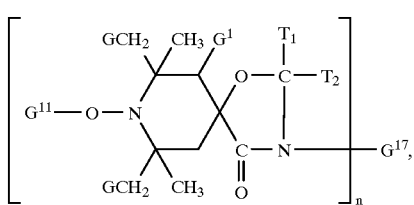

wherein n is 1 or 2, and G, $G^1$ and $G^{11}$ have the meaning indicated in (a), $G^{16}$ is hydrogen, $C_1$–$C_{12}$alkyl, allyl, benzyl, glycidyl or $C_2$–$C_6$alkoxyalkyl, and $G^{17}$, if n=1, is hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C_6$alkoxyalkyl, $C_6$–$C_{10}$aryl, glycidyl, or a group of formula —($CH_2$)p—COO—Q or of formula —($CH_2$)p—O—CO—Q, wherein p is 1 or 2, and Q is $C_1$–$C_4$alkyl or phenyl; if n=2, is $C_2$–$C_{12}$alkylene, $C_4$–$C_{12}$alkenylene, $C_6$–$C_{12}$arylene, a group —$CH_2$—CH(OH)—$CH_2$—O—D—O—$CH_2$—CH(OH)—$CH_2$—, wherein D is $C_2$–$C_{10}$alkylene, $C_6$–$C_{15}$arylene, $C_6$–$C_{12}$cycloalkylene, or a group —$CH_2$CH(OZ')$CH_2$—(O$CH_2$—CH(OZ-)$CH_2$)$_2$—, wherein Z' is hydrogen, $C_1$–$C_{18}$alkyl, allyl, benzyl, $C_2$–$C_{12}$alkanoyl or benzoyl, $T_1$ and $T_2$ are each independently of the other hydrogen, $C_1$–$C_{18}$alkyl or $C_6$–$C_{10}$aryl or $C_7$–$C_9$aralkyl each of which may be substituted by halogen or $C_1$–$C_4$alkyl, or $T_1$ and $T_2$, together with the linking carbon atom, form a $C_5$–$C_{14}$cycloalkane ring.

Substituents $C_1$–$C_{12}$alkyl are typically methyl, ethyl, n-propyl, n-butyl, sec-butyl, tert-butyl, n-hexyl, n-octyl, 2-ethylhexyl, n-nonyl, n-decyl, n-undecyl or n-dodecyl.

Substituents defined as $C_1$–$C_{18}$alkyl may typically be the groups indicated above and also e.g. n-tridecyl, n-tetradecyl, n-hexadecyl or n-octadecyl.

Substituents $C_2$–$C_6$alkoxyalkyl are typically methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$G^{17}$ defined as $C_3$–$C_5$alkenyl is typically 1-propenyl, allyl, methallyl, 2-butenyl or 2-pentenyl.

$G^{17}$, $T_1$ and $T_2$ defined as $C_7$–$C_9$aralkyl are preferably phenethyl or, more particularly, benzyl. If $T_1$ and $T_2$, together with the carbon atom, form a cycloalkane ring, then said ring may typically be a cyclopentane, cyclohexane, cyclooctane or cyclododecane ring.

$G^{17}$ defined as $C_2$–$C_4$hydroxyalkyl is typically 2-hydroxyethyl, 2-hydroxypropyl, 2-hydroxybutyl or 4-hydroxybutyl.

$G^{17}$, $T_1$ and $T_2$ defined as $C_6$–$C_{10}$aryl is preferably phenyl, α- or β-naphthyl, each of which may be substituted by halogen or $C_1$–$C_4$alkyl.

$G^{17}$ defined as $C_2$–$C_{12}$alkylene is typically ethylene, propylene, 2,2-dimethylpropylene, tetramethylene, hexamethylene, octamethylene, decamethylene or dodecamethylene.

$G^{17}$ defined as $C_4$–$C_{12}$alkenylene is preferably 2-butenylene, 2-pentenylene or 3-hexenylene.

$G^{17}$ defined as $C_6$–$C_{12}$arylene is typically o-, m- or p-phenylene, 1,4-naphthylene or 4,4'-diphenylene.

Z' defined as $C_2$–$C_{12}$alkanoyl is typically propionyl, butyryl, octanoyl, dodecanoyl, but is preferably acetyl.

D defined as $C_2$–$C_{10}$alkylene, $C_6$–$C_{15}$arylene or $C_6$–$C_{12}$cycloalkylene is as defined under (b).

(e) Compounds of formula VIII, which are likewise preferred,

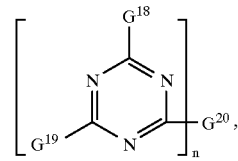

wherein n is 1 or 2, and $G^{18}$ is a group of one of formula

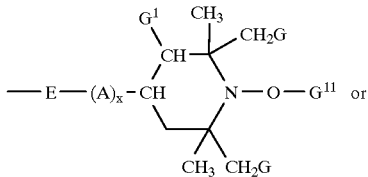

-continued

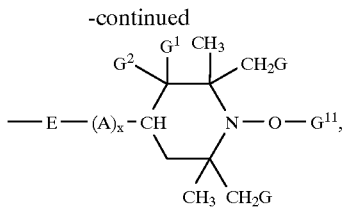

wherein G and $G^{11}$ are as defined in (a), G being most preferably hydrogen and $G^{11}$ being most preferably $C_1$–$C_{10}$alkyl or cyclohexyl, and $G^1$ and $G^2$ are hydrogen, methyl or, taken together, are a substituent =O, E is —O— or —$NG^{13}$—, A is $C_2$–$C_6$alkylene or —$(CH_2)_3$—O—, and x is either 0 or 1, $G^{13}$ is hydrogen, $C_1$–$C_{12}$alkyl, $C_2$–$C_5$hydroxyalkyl or $C_5$–$C_7$cycloalkyl, $G^{19}$ is identical to $G^{18}$ or is one of the groups —$NG^{21}G^{22}$, —$OG^{23}$, —$NHCH_2OG^{23}$ or —$N(CH_2OG^{23})_2$, $G^{20}$, if n=1, is identical to $G^{18}$ or $G^{19}$, and, if n=2, is a group —E—B—E—, wherein B is $C_2$–$C_8$ alkylene or $C_2$–$C_8$alkylene which is interrupted by 1 or 2 groups –$N(G^{21})$—, $G^{21}$ is $C_1$–$C_{12}$alkyl, cyclohexyl, benzyl or $C_1$–$C_4$hydroxyalkyl, or a group of formula (Va)

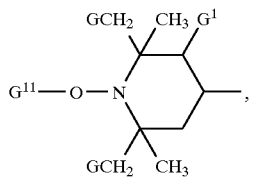
(Va)

$G^{22}$ is $C_1$–$C_{12}$-alkyl, cyclohexyl, benzyl, $C_1$–$C_4$-hydroxyalkyl, and $G^{23}$ is hydrogen, $C_1$–$C_{12}$alkyl or phenyl, or $G^{21}$ and $G^{22}$, taken together, are $C_4$–$C_5$alkylene or $C_4$–$C_5$oxaalkylene, typically

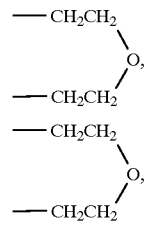

or a group of formula

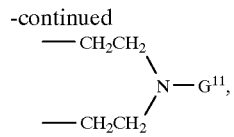

or $G^{21}$ is a group of formula

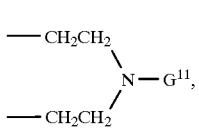

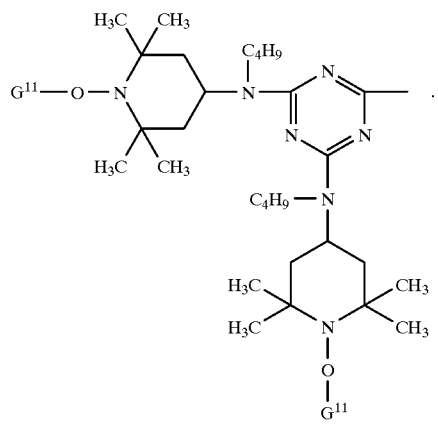

$C_1$–$C_{12}$Alkyl substituents are typically methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$–$C_4$Hydroxyalkyl substituents are typically 2-hydroxyethyl, 2-hydroxypropyl, 3-hydroxypropyl, 2-hydroxybutyl or 4-hydroxybutyl.

A defined as $C_2$–$C_6$alkylene is typically ethylene, propylene, 2,2-dimethylpropylene, tetramethylene or hexamethylene.

$G^{21}$ and $G^{22}$ together defined as $C_4$–$C_5$alkylene or oxaalkylene are typically tetramethylene, pentamethylene or 3-oxapentamethylene.

Important examples for polyalkylpiperidine compounds of this class are compounds of the following formulae:

7)
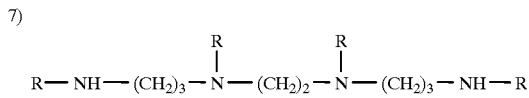

-continued
wherein R =
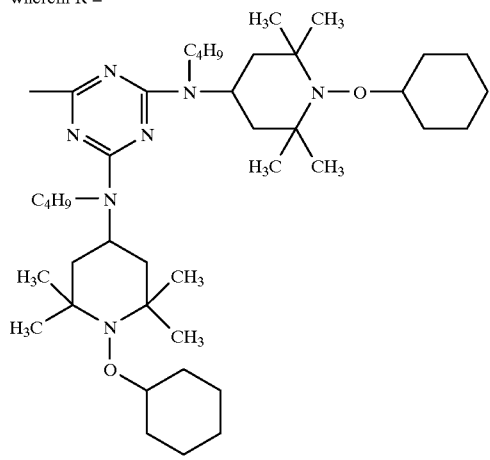
8)
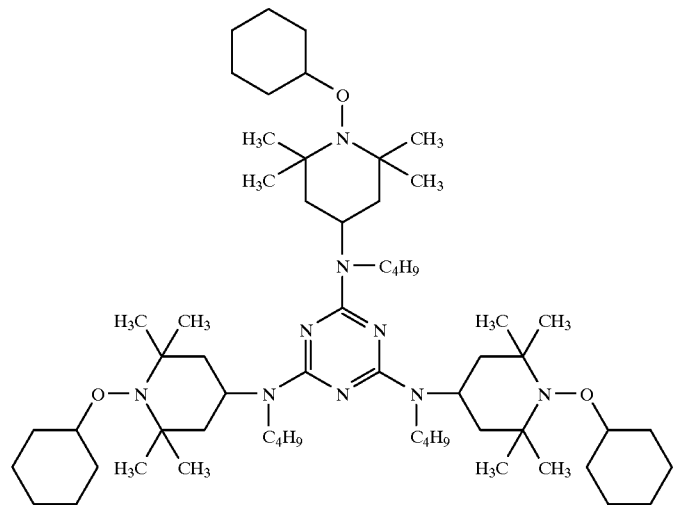
9)
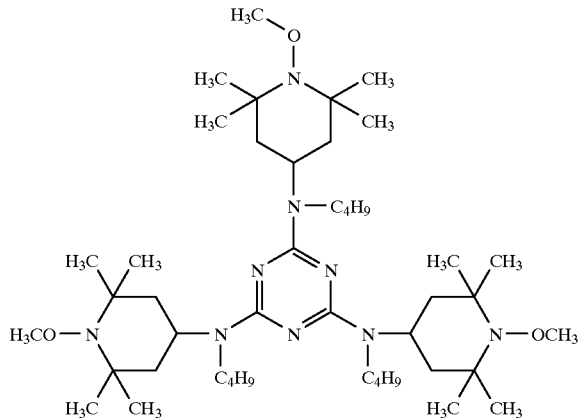

10)

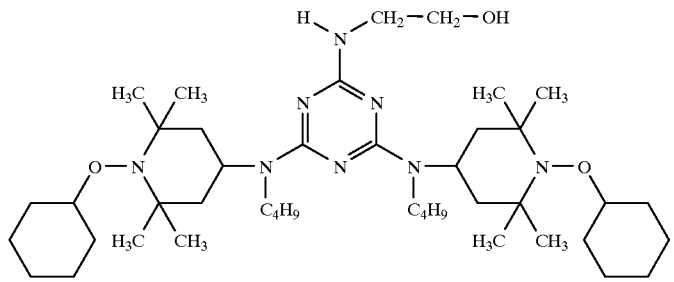

(f) Oligomeric or polymeric compounds, whose structural repeating unit contains a N substituted 2,2,6,6-tetraalkylpiperidine radical of formula III, preferably polyesters, polyethers, polyamides, polyamines, polyurethanes, polyureas, polyaminotriazines, poly(meth)acrylates, poly(meth)acrylamides and the copolymers thereof containing such radicals.

Aromatic compounds and residues mentioned, such as aromatic carboxylic acids, aromatic carbamic acids, or araliphatic or aralkyl moieties are characterized in that they contain an aromatic moiety which is a ring structure with a bonding system containing (4i+2) π-electrons, where i is an integer. Aromatic moieties are preferably carbocyclic; typically they are phenyl or naphthyl. Accordingly, typical examples for araliphatic or aralkyl moieties are benzyl, methylbenzyl, tolyl or xylyl. Typical aromatic carboxylic acids include benzoic acid as well as benzene carrying 2 or more groups COOH such as phthalic acid.

Residues denoted as alkyl without further specification are preferably n-alkyl; for example, octyl (the radical $C_8H_{17}$) are preferably n-octyl (the radical $[CH_2]_7—CH_3$).

Preferred as component A in a composition of the invention is a sterically hindered amine derivative of formula IV or VIII (groups a and e).

Usually, the synthetic organic polymer stabilized according the invention contains from 0.01 to 5% by weight of the sterically hindered amine derivative and from 0.005 to 6% by weight of the compound containing an oxo and/or hydroxyl group bonded to a metal atom, relative to the weight of the polymer to be stabilized. Advantageous ranges for both stabilizer components are from 0.025 to 2%, especially from 0.05 to 1% by weight of the sterically hindered amine derivative, and from 0.005 to 3%, e.g. from 0.005 to 1%, especially from 0.025 to 0.5% by weight of the oxo and/or hydroxyl containing metal compound.

The sterically hindered hydroxylamine, or ether or ester thereof, can be an individual compound or a mixture of compounds. In the case of a mixture of compounds, the amounts given refer in each case to the total amount of sterically hindered amine derivatives used.

If a hydrotalcite is employed in addition to a simple metal oxide or hydroxide, it may advantageously be employed in an amount from 0.005 to 3%, especially from 0.2 to 3% by weight of the polymer to be stabilized, so that the total dosage of the compound containing an oxo and/or hydroxyl group bonded to a metal atom given above may be from about 0.01 to 6%.

The composition of the invention may contain further additives in addition to the components described above, such as the following:

1. Antioxidants
    1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-dinonyl-4-methylphenol, 2,4-dimethyl-6-(1'-methyl-undec-1'-yl)phenol, 2,4-dimethyl-6-(1'-methylheptadec-1'-yl)phenol, 2,4-dimethyl-6-(1'-methyltridec-1'-yl)phenol and mixtures thereof.
    1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
    1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.
    1.4. Tocopherols, for example α-tocopherol, β-tocopherol, γ-tocopherol, δ-tocopherol and mixtures thereof (Vitamin E).
    1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl) disulfide.
    1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy- 2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl] terephthalate, 1,1-bis-(3,5-dimethyl-2-hydroxyphenyl) butane, 2,2-bis-(3,5-di-tert-butyl-4-hydroxyphenyl) propane, 2,2-bis-(5-tert-butyl- 4-hydroxy2-methylphenyl)-4-n-dodecylmercaptobutane, 1,1,5,5-tetra-(5-tert-butyl-4-hydroxy2-methylphenyl)pentane.

1.7. O-, N- and S-benzyl compounds, for example 3,5,3', 5'-tetra-tert-butyl-4,4'-dihydroxydibenzyl ether, octadecyl-4-hydroxy-3,5-dimethylbenzylmercaptoacetate, tridecyl-4-hydroxy-3, 5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3, 5-di-tert-butyl-4-hydroxybenzyl)sulfide, isooctyl-3, 5di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris (3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3, 5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3, 5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6, 7-trioxabicyclo[2.2.2] octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6, 7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)

amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, Bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazin, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl) benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl) benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutylphenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-β-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butane-tetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dion, bis (1-octyloxy-2,2,6,6-tetramethylpiperidyl)sebacate, bis (1-octyloxy-2,2,6,6-tetramethylpiperidyl)succinate, the condensate of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4- piperidyl)hexamethylenediamine and 4-cyclohexylamino-2,6-dichloro-1,3,5-triazine, a condensation product of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro [4,5]decane and epichlorohydrin, propanedioic acid (4-methoxyphenyl)-methylene-bis (1,2,2,6,6-pentamethyl-4-piperidyl) ester, N,N'-bis-formyl-N,N'-bis(2,2,6,6-tetramethyl-4-piperidyl)-hexamethylenediamine, poly-[methylpropyl-3-oxy-4-(2,2,6,6-tetramethyl-4-piperidyl)]-siloxane, a reaction product of maleic acid-α-olefin copolymer and 2,2,6, 6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with $^2$-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2, 4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2, 4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl] -4,6-bis(2,4-dimethylphenyl)-1,3,5-triazine, 2-($^2$-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-($^2$-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenyl-propionyl) hydrazine, 3-salicyloylamino-1,2,4-triazole, bis(benzylidene)oxalyl dihydrazide, oxanilide, isophtha-loyl dihydrazide, sebacoyl bisphenylhydrazide, N,N'-diacetyladipoyl dihydrazide, N,N'-bis(salicyloyl)oxalyl dihydrazide, N,N'-bis(salicyloyl)-thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2, 4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methylphosphite, bis(2,4-di-tert-butyl-6-methylphenyl)ethylphosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

In many cases, the synthetic organic polymer of the invention contains as additional stabilizer a salt of a carboxylic acid (metal carboxylate), especially a $C_8$–$C_{22}$carboxylic acid; of utmost importance are salts of a $C_8$–$C_{18}$carboxylic acid. Metal carboxylates optionally to be added are mainly salts of Al, Ba, Ca, Mg, Sr or Zn. Preferred are salts of aluminum, calcium, magnesium or zinc, especially of $C_{12}$–$C_{18}$carboxylic acids. Most preferred are calcium salts, for example calcium stearate.

Of utmost importance are compositions according to the invention wherein component A is one of the above compounds Nos. 3, 5, 6 and/or 7, component B is ZnO, a hydrotalcite or a mixture of both, and optionally calcium stearate added, especially those wherein the synthetic organic polymer is polyethylene. Examples for such stabilizer compositions are compound No. 7 and ZnO and calcium stearate,
compound No. 7 and hydrotalcite, or
compound No. 7 and hydrotalcite and ZnO.

Preferred is a composition, in which the synthetic organic polymer contains in addition to components A and B one or more further components selected from further stabilizers, fillers, reinforcing agents, pigments, dyes, plasticisers, solvents, lubricants, flow-control agents, fluorescent brighteners, nucleating agents, antistatic agents or fire-retarding agents. Especially preferred are further components selected from alkaline earth metal salts, zinc salts and aluminum salts of a carboxylic acid such as the above calcium stearate, and UV absorbers.

Examples for preferred stabilizer mixtures are the following (all percentages given are by weight of the polymer):

a) 0.25% of hydroxylamine ether No. 7), 0.20% of ZnO, 0.20% of Ca-stearate;
b) 0.15% of hydroxylamine ether No. 6), 0.20% of ZnO, 0.20% of Ca-stearate;
c) 0.15% of hydroxylamine ether No. 7), 0.20% of ZnO, 0.20% of Ca-stearate;
d) 0.40% of hydroxylamine ether No. 7), 0.20% of ZnO, 0.20% of Ca-stearate.

UV absorbers optionally to be added often are selected from 2-(2'-Hydroxyphenyl)benzotriazoles, 2-Hydroxybenzophenones, Oxamides and/or 2-(2-Hydroxyphenyl)-1,3,5-triazines. Preferred are 2-(2'-hydroxyphenyl)-benzotriazole UV absorbers; examples for such compounds are 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl) benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)- 5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)-benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2 '-hydroxy-5'-(2-octyloxycarbonylethyl)phenyl) benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylene-bis[4-( 1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]—$_2$, where R=3'-tert-butyl-4'-hydroxy-5'-2H-benzotriazol-2-ylphenyl.

Metal carboxylates are advantageously employed in an amount from 0.05 to 2%, especially from 0.1 to 1% by weight of the polymer.

UV absorbers are advantageously employed in an amount from 0.01 to 5%, especially from 0.05 to 2% by weight of the polymer to be stabilized.

For compositions according to the invention, in particular the addition of those sterically hindered amine derivatives is preferred whose molecular weight or average molecular weight ($M_n$) is in the range 300 to 10,000, in particular in the range 1000 to 10,000. Of these, those sterically hindered amine derivatives whose molecular weight or average molecular weight is in the range 1500 to 10,000, for example in the range 2000 to 7500 may again be mentioned in particular.

All components of the stabilizer composition according to the invention mentioned are known compounds; many of them are commercially available.

Incorporation of the stabilizers into the polymer can be effected by adding the stabilizers according to the invention and, if desired, other additives by the methods conventional in industry. Incorporation can be effected advantageously before or during shaping, for example by mixing the pulverulent components or by adding the stabilizer to the melt or solution of the polymer, or by applying the dissolved or dispersed stabilizers to the polymer, followed if desired by the evaporation of the solvent. A further possibility for incorporating the stabilizers according to the invention into polymers consists in their addition before or during the polymerization of the corresponding monomers or before crosslinking.

The invention also pertains to a process for the stabilization of a synthetic organic polymer against the deleterious effects of light, oxygen and/or heat, comprising incorporation of a sterically hindered hydroxylamine, or an ether or ester thereof, and a compound containing an oxo and/or hydroxyl group bonded to a metal atom into the polymer, and to a correspondung use of this stabilizer system.

The stabilizers according to the invention or mixtures thereof can also be added to the polymer to be stabilized in the form of a masterbatch which contains these stabilizers in, for example, a concentration of from 2.5 to 25% by weight.

The stabilizers according to the invention are advantageously incorporated by the following possible methods:
- as emulsion or dispersion (e.g. to latices or emulsion polymers)
- as a dry mixture during the mixing of additional components or polymer mixtures
- by direct addition to the processing apparatus (e.g. extruder, calender etc.)
- as solution or melt.

It has to be emphasized that a polyolefin or olefin copolymer composition of the invention, wherein the polyolefin or olefin copolymer is in the form of a film, shows not only improved resistance against degradation caused by actinic light, oxygen and/or heat, but also against the detrimental effects of pesticides which come in contact with the polyolefin or olefin copolymer film. Accordingly, another subject of the invention is a polyolefin or olefin copolymer film in contact with a pesticide and stabilized against photodegradation, characterized in that the polyolefin or olefin copolymer film contains a sterically hindered hydroxylamine, or an ether or ester thereof, and a compound containing an oxo and/or hydroxyl group bonded to a metal atom.

Preferably, polyolefines or olefin copolymer films stabilized according to the invention are employed in agricultural, especially in greenhouse applications.

The invention also pertains to a composition comprising a pesticide and a polyolefin or olefin copolymer film stabilized with a sterically hindered hydroxylamine, or an ether or ester thereof, and a compound containing an oxo and/or hydroxyl group bonded to a metal atom; to a process for the stabilization of a polyolefin or olefin copolymer film against the deleterious effects of light, oxygen, heat and/or pesticides, comprising incorporation of a sterically hindered hydroxylamine, or an ether or ester thereof, and a compound containing an oxo and/or hydroxyl group bonded to a metal atom into the polymer film; and to a correspondung use of this stabilizer system in agricultural, especially greenhouse applications.

The pesticides which may contribute to a faster photodegradation, often are those containing halogen and/or sulfur atoms. Halogen containing pesticides usually embrace compounds containing fluorine, chlorine or bromine, especially chlorine. Compound classes, whose detrimental effects on the photostability of polyolefin or olefin copolymer films can be most effectively prevented by the instant invention, include pyrethroides of the permethrin and fenvalerate type, thioureas, dithiocarbamates, thio- and isothiocyanates and compounds generating these compounds, especially permethrin type compounds containing chlorine and dithiocarbamates such as derivatives of vinylidene dichloride and metal salts of alkyldithiocarbamic acid.

Subject of the invention is also a stabilizer composition for polyolefin or olefin copolymer films in contact with pesticides comprising a sterically hindered hydroxylamine, or an ether or ester thereof, and a compound containing an oxo and/or hydroxyl group bonded to a metal atom.

The resulting stabilized polymer composition, especially a polyolefin or olefin copolymer composition, can be converted into films by the conventional methods.

The invention therefore also relates to a process for the stabilization of polyolefin or olefin copolymer films for agricultural applications, especially greenhouse applications, this polyolefin or olefin copolymer film having improved light stability and pesticide resistance, comprising incorporation of a sterically hindered hydroxylamine, or ether or ester thereof, and a compound containing, an oxo and/or hydroxyl group bonded to a metal atom into the polyolefin or olefin copolymer. A further subject of the invention is a greenhouse, characterized in that it is covered by a polyolefin or olefin copolymer film having, improved light stability and pesticide resistance and stabilized with a sterically hindered hydroxylamine, or an ether or ester thereof, and a compound containing an oxo and/or hydroxyl group bonded to a metal atom.

Further subjects of the invention are the use of a polyolefin or olefin copolymer film stabilized with a sterically hindered hydroxylamine, or an ether or ester thereof, and a compound containing an oxo and/or hydroxyl group bonded to a metal atom for agricultural applications involving pesticides, especially greenhouse applications, and the use of a sterically hindered hydroxylamine, or an ether or ester thereof, in combination with a compound containing an oxo and/or hydroxyl group bonded to a metal atom for the stabilization of polyolefin or olefin copolymer films in contact with pesticides against photodegradation and damage by pesticides.

The following examples further illustrate the embodiments of the instant invention. All parts given are by weight unless otherwise noted. The following hindered amine compounds (component A) are used in the examples:

compound No. 3):

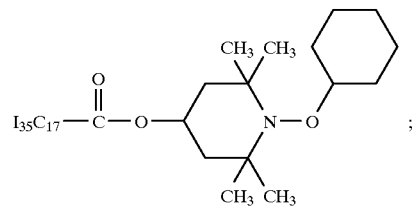

compound No. 5):

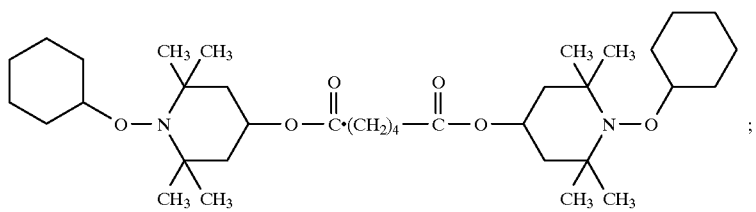

compound No. 6):

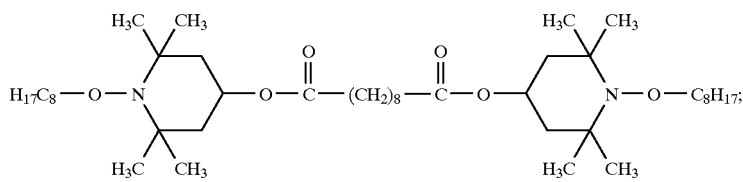

compound No. 7):

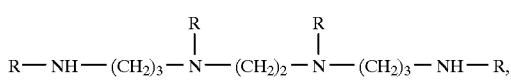

wherein R =

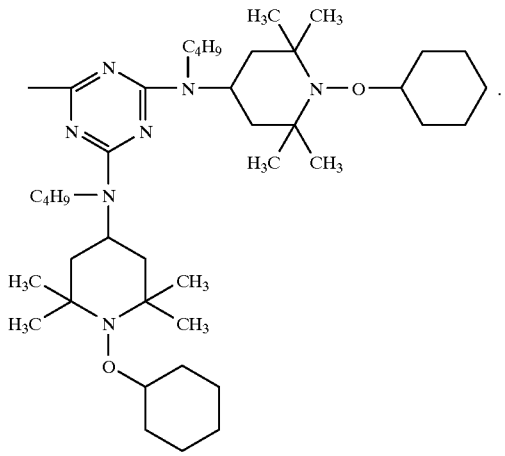

LDPE stands for polyethylene of low density.

EXAMPLE 1

Light Stabilization of Polypropylene Fibres

The compounds indicated in table 1 below together with 1 g of tris(2,4-di-tert-butylphenyl) phosphite, 0.5 g of calcium monoethyl 3,5-di-tert-butyl-4-hydroxybenzyl phosphonate and 1 g of calcium stearate are mixed with 1000 g of polypropylene powder (melt flow index 12 g/10 min, measured at 230° C. and 2.16 kg) in a turbo mixer.

The mixtures are extruded at 200–230° C. to give granules; these are subsequently converted into fibres using a pilot plant (Leonard-Sumirago (VA), Italy) under the following conditions:

| Extruder temperature: | 200–230° C. |
|---|---|
| Head temperature: | 235° C. |
| Stretch ratio: | 1:3.5 |
| Count: | 11 dtex per filament |

The fibres produced in this way are exposed against a white cardboard in a Weather-O-Meter Type 65WR with a black panel temperature of 63° C. in accordance with ASTM D 2565-85. After various exposure times, the residual tensile strength of the samples is measured by means of a constant-speed tensometer. The exposure time $T_{50}$ needed to halve the initial tensile strength is then calculated.

Some fibers are tentered before exposure for 20 minutes at 120° C. in a forced circulating air oven. The exposure time $T'_{50}$ needed to halve the initial tensile strength of these fibers is then calculated as described above.

The results are shown in Table 1 below. The amount data are based on the weight of the polypropylene employed. Stabilizers A and B correspond to components A and B described above; stabilizer C is an additional component optional to be added.

TABLE 1

Exposure duration ($T_{50}$/h; $T'_{50}$/h for tentered samples) for the tensile strength to half

| Stabilizer A | B | C | $T_{50}$/h | $T'_{50}$/h |
|---|---|---|---|---|
| 0.25% compound 7) | none | none | 1420 | 1130 |
| 0.25% compound 7) | 0.2% ZnO | 0.2% Ca-stearate | 1680 | 1520 |

The fibres stabilized according to the invention have excellent tenacity.

EXAMPLE 2

Stabilization of Polyethylene Films

The additives reported in table 2 below are mixed via masterbatch with LDPE pellets (Riblene®FF 29, supplied by ENICHEM, Milano, Italy; d=0.921 g/cm³; MFI(190° C./2.16 kg)=0.60 g/10 min.) in a slow mixer. The master batches had previously been prepared by extruding powdered LDPE and 10% by weight of the sterically hindered hydroxylamine ether (component A) and the relevant concentrations of components B (=oxo and/or hydroxyl group containing metal compound) and C (here: salt of carboxylic acid).

The mixtures are blow extruded at 200° C. Films of thickness 150 μm are obtained.

Some of the films are treated with pesticides and/or acid in the way indicated in the following table:

| | |
|---|---|
| *2* | films are stored before WOM exposure for 20 days over a concentrated solution of VAPAM ® in water (1:1 relation in parts by volume) without direct contact with the solution; |
| *2W* | films are subjected to 24 h of initial WOM exposure, then stored for 20 days over a concentrated solution of VAPAM ® in water (1:1 relation in parts by volume) without direct contact with the solution, and subsequently subjected to WOM exposure; |
| *3* | films are immersed before WOM exposure for 24 h in 0.1 N aqueous solution of $H_2SO_3$. |

VAPAM® (BASLINI SpA, Treviglio/BG, Italy) is an aqueous solution of 382 g per liter of metam-sodium having the formula $CH_3$—NH—CS—SNa.

After the above treatment, film samples are exposed against a white cardboard in a Weather-O-Meter Type 65WR with a black panel temperature of 63° C. The degradation process is monitored by measuring the increase of carbonyl in the sample with a Fourier Transform Infrared Spectrophotometer. A high increase of carbonyl indicates high degradation. The results are given in the following table 2 (arbitrary units). The amount data are based on the weight of the polyethylene employed. Stabilizers A and B correspond to components A and B described above; stabilizer C is an additional component optional to be added.

TABLE 2

Increase of carbonyl concentration (iCO) after 740 h Exposure

| | | | iCO after treatment | | | |
|---|---|---|---|---|---|---|
| Stabilizer A | B | C | none | *2* | *3* | *2W* |
| 0.15% compound 6) | none | none | | 0.46 | | |
| 0.15% compound 6) | 0.2% ZnO | 0.2% Ca-s | | 0.12 | | |
| 0.15% compound 7) | none | none | | 0.50 | | |
| 0.15% compound 7) | 0.2% ZnO | 0.2% Ca-s | | 0.28 | | |

Ca-s is Calciumstearate

It is evident, that the addition of a stabilizer combination of the invention provides far more effective stabilization than addition of hydroxylamine ether alone.

EXAMPLE 3

Stabilization of Greenhouse Films

The compounds reported in table 3 are mixed via master batch with LDPE (polyethylene of low density) pellets (Riblene®FF 29 V, supplied by ENICHEM, Milano, Italy), characterized by a density of 0.921 g/cm³ and a melt flow index (190° C./2.16 kg) of 0.60 g/10 min, in a slow mixer.

The master batches had previously been prepared by extruding powdered LDPE and 10% by weight of the sterically hindered hydroxylamine ether (component A) and the relevant concentrations of components B (=oxo and/or hydroxyl group containing metal compound) and C (here: salt of carboxylic acid). The mixtures are blow extruded at 200° C., and films of 150 microns thickness are obtained.

The films are exposed on the south-facing roof of a greenhouse in Pontecchio Marconi (Bologna, Italy).

The following pesticides are applied in the greenhouse:

VAPAM® (BASLINI SpA, Treviglio/BG, Italy), which is an aqueous solution of 382 g per liter of metam-sodium having the formula $CH_3$—NH—CS—SNa;

SESMETRIN® (BIMEX SpA, Isola/VI, Italy), which is a 23.75% (% w/w) aqueous solution of permethrin having the formula

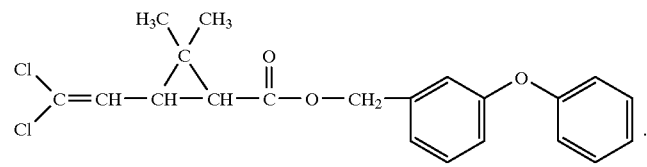

The greenhouse is treated with a solution of 4 liters of VAPAM in 10 liters of water every 6 months, and with SESMETRIN (5 g in 5 liters of water) every month.

During the exposure, the performance is periodically evaluated measuring the increase of carbonyl concentration in the sample with a Fourier Transform Infrared Spectrophotometer. A high increase of carbonyl indicates high degradation.

The results are given in the following table 3. The exposure is measured in kilolangley (Klys.; energy per unit area); 100 Klys. corresponds to 1 year of exposure. All concentrations given are in percent by weight of the polymer.

TABLE 3

Increase of carbonyl concentration (iCO) after exposure

| % Component | | | iCO after Exposure with |
|---|---|---|---|
| A | B* | C** | 100 Klys. |
| 0.4% cpd.7) | none | none | 0.060 |
| 0.4% cpd.7) | (0.2) | (0.2) | 0.038 |

*component B is ZnO
**component C is calcium stearate

EXAMPLE 4

Stabilization of Polyethylene Films

The compounds reported in table 4 are mixed with ground LDPE (polyethylene of low density; Riblene®FF 29, supplied by ENICHEM, Milano, Italy), characterized by a density of 0.921 g/cm³ and a melt flow index (190° C./2.16 kg) of 0.60 g/10 min, in a turbo mixer.

The mixtures are extruded at 200° C. and pressmolded films of 150 microns thickness are subsequently obtained after 3 minutes at 170° C.

The films are submitted for 20 days at 30° C. to vapors of a solution of water and VAPAM® (1:1 by volume). VAPAM® (BASLINI SpA, Treviglio/BG, Italy) is an aqueous solution of 382 g per liter of metam-sodium having the formula $CH_3$—NH—CS—SNa.

Subsequently, the film samples are exposed against a white cardboard in a Weather-O-Meter Type 65WR with a black panel temperature of 63° C. The degradation process is monitored by measuring the increase of carbonyl in the sample with a Fourier Transform Infrared Spectrophotometer. A high increase of carbonyl indicates high degradation. The results after 500 h of exposure are given in the following table 4 (arbitrary units). All concentrations given are in percent by weight of the polymer.

TABLE 4

Increase of carbonyl concentration (iCO) after 500 h exposure

| % Component | | | iCO after 500 h Exposure |
|---|---|---|---|
| A | B* | B** | |
| 0.15% cpd.7) | none | none | 0.42 |
| 0.15% cpd.7) | none | (0.5) | 0.15 |
| 0.15% cpd.7) | (0.2) | (0.5) | 0.07 |
| 0.15% cpd.6) | none | none | 0.39 |
| 0.15% cpd.6) | (0.2) | none | 0.11 |
| 0.15% cpd.6) | none | (0.5) | 0.08 |
| 0.15% cpd.6) | (0.2) | (0.5) | 0.04 |
| 0.15% cpd.5) | none | none | 0.37 |
| 0.15% cpd.5) | (0.2) | (0.5) | 0.04 |
| 0.15% cpd.3) | none | none | 0.38 |
| 0.15% cpd.3) | (0.2) | none | 0.16 |
| 0.15% cpd.3) | (0.2) | (0.5) | 0.07 |

B* is ZnO
B** is hydrotalcite of formula $Mg_{4.5}Al_2(OH)_{13}CO_3·3.5 H_2O$

The superiority of films stabilized according the invention, containing a metal oxide and/or hydroxide and optional further components is evident.

What is claimed is:

1. Composition for agricultural use comprising a polyolefin or olefin copolymer and, as stabilizer against the deleterious effects of light, oxygen and/or heat, a combination of A) a sterically hindered hydroxylamine ether containing a group of the formula

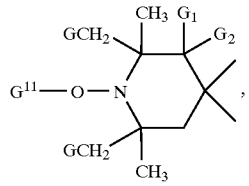

wherein G is hydrogen or methyl; $G_1$ and $G_2$ are hydrogen, methyl or, taken together, are =O; and $G^{11}$ is $C_6$–$C_{10}$ alkyl or cyclohexyl, and B) a compound selected from simple and complex oxides, hydroxides and mixed oxides/hydroxides of main group II or III or M transition group II metals, and zeolites and hydrotalcites to achieve enhanced stabilization efficacy.

2. Composition according to claim 1, wherein component B is a mixture of a hydrotalcite and a simple oxide or hydroxide of a metal of main group II or III or transition group II of the periodic system.

3. Composition according to claim 1, wherein component B is selected from zinc oxide, zinc hydroxide, ortho and meta aluminum hydroxide, α- and γ-$Al_2O_3$, MgO, Mg(OH)$_2$, and hydrotalcites of the formulae $Al_2O_3·6MgO·CO_2·12H_2O$; $Mg_{4.5}Al_2(OH)_{13}·CO_3·3,5H_2O$; $4MgO·Al_2O_3·CO_2·9H_2O$; $4MgO·Al_2O_3·CO_2·6H_2O$; $ZnO·3MgO·Al_2O_3·CO_2·8–9H_2O$; $ZnO·3MgO·Al_2O_3·CO_2·5–6H_2O$; $Mg_{4.5}Al_2(OH)_{13}·CO_3$.

4. Composition according to claim 1, wherein component A is selected from the compounds 1-cyclohexyloxy-4-stearoyloxy-2,2,6,6-tetramethylpiperidine, bis(1-cyclohexyloxy-2,2,6,6-tetramethylpiperidin-4-yl)succinate, bis(1-cyclohexyloxy-2,2,6,6-tetramethylpiperidin-4-yl) adipate, bis(1-octyloxy-2,2,6,6-tetramethylpiperidin-4-yl) sebacate, and the compounds of formulae

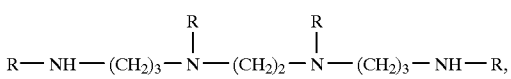

wherein R is
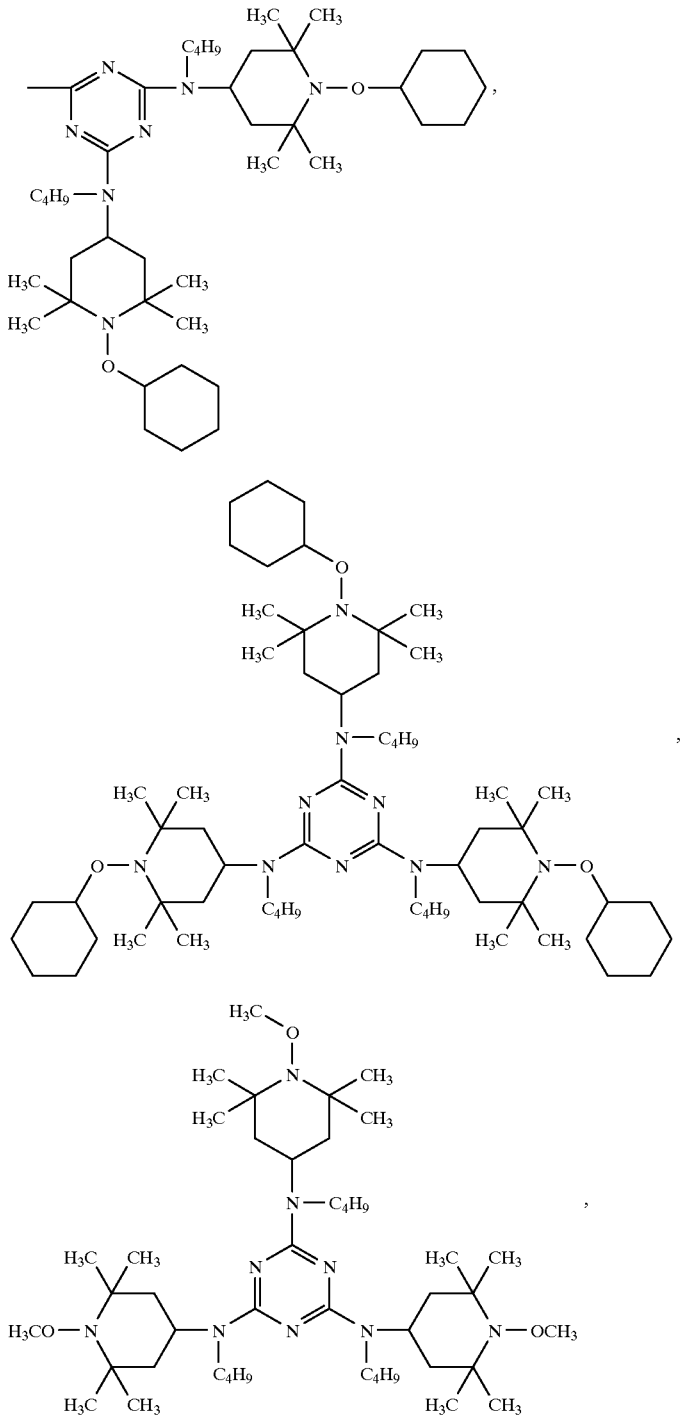

-continued

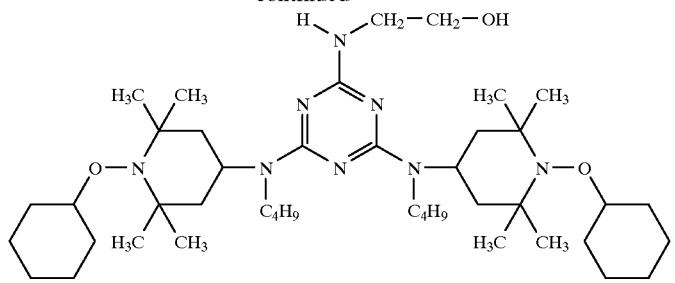

5. Composition according to claim 1 containing from 0.01 to 5% by weight of component A and from 0.005 to 6% by weight of component B, relative to the weight of the polyolefin or olefin copolymer.

6. Composition according to claim 4 containing from 0.005 to 3% by weight of a hydrotalcite in addition to 0.005 to 3% by weight of a simple metal oxide or hydroxide of a metal of main group II or III or transition group II of the periodic system, relative to the weight of the polyolefin or olefin copolymer.

7. Composition according to claim 1 containing in addition to components A and B a further component selected from further stabilizers, fillers, reinforcing agents, pigments, dyes, plasticisers, solvents, lubricants, flow-control agents, fluorescent brighteners, nucleating agents, antistatic agents or fire-retarding agents.

8. Composition according to claim 7 containing in addition to components A and B a further component selected from alkaline earth metal salts, zinc salts and aluminum salts of a carboxylic acid, and UV absorbers.

9. Composition according to claim 8 containing from 0.05 to 2% by weight of a metal carboxylate, relative to the weight of the polyolefin or olefin copolymer.

10. Process for the stabilization of a polyolefin or olefin copolymer composition for agricultural use against the deleterious effects of light, oxygen and/or heat, comprising incorporation of a sterically hindered hydroxylamine ether containing a group of the formula

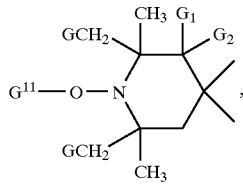

wherein G is hydrogen or methyl; $G_1$ and $G_2$ are hydrogen, methyl or, taken together, are =O; and $G^{11}$ is $C_6$–$C_{10}$ alkyl or cyclohexyl, and a compound selected from simple and complex oxides, hydroxides and mixed oxides/hydroxides of main group II or III or transition group II metals, and zeolites and hydrotalcites into the polymer to achieve enhanced stabilization efficacy.

11. Polyolefin or olefin copolymer composition according to claim 1 in form of a film in contact with a pesticide.

12. Composition according to claim 11, wherein the pesticide contains halogen and/or sulfur atoms.

13. Composition according to claim 11, which is a greenhouse film.

14. Process for the stabilization of a polyolefin or olefin copolymer film against the deleterious effects of light, oxygen, heat and/or pesticides, comprising incorporation of a sterically hindered hydroxylamine ether containing a group of the formula

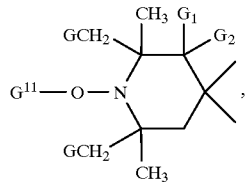

wherein G is hydrogen or methyl; $G_1$ and $G_2$ are hydrogen, methyl or, taken together, are =O, and $G^{11}$ is $C_6$–$C_{10}$ alkyl or cyclohexyl, and a compound selected from simple and complex oxides, hydroxides and mixed oxides/hydroxides of main group II or III or transition group II metals, and zeolites and hydrotalcites into the polymer film to achieve enhanced stabilization efficacy.

15. Process according to claim 14, wherein the polyolefin or olefin copolymer film is an agricultural film for applications involving pesticides.

* * * * *